(12) United States Patent
Posselius et al.

(10) Patent No.: US 10,524,409 B2
(45) Date of Patent: Jan. 7, 2020

(54) SYSTEM AND METHOD FOR CONTROLLING AGRICULTURAL PRODUCT APPLICATION BASED ON RESIDUE COVERAGE

(71) Applicants: CNH Industrial America LLC, New Holland, PA (US); Autonomous Solutions, Inc., Mendon, UT (US)

(72) Inventors: John Henry Posselius, Ephrata, PA (US); Luca Ferrari, Formigine (IT); Taylor Chad Bybee, Logan, UT (US); Bret Todd Turpin, Wellsville, UT (US)

(73) Assignees: CNH Industrial America LLC, New Holland, PA (US); Autonomous Solutions, Inc., Mendon, UT (US)

( * ) Notice: Subject to any disclaimer, the term of this patent is extended or adjusted under 35 U.S.C. 154(b) by 305 days.

(21) Appl. No.: 15/583,684

(22) Filed: May 1, 2017

(65) Prior Publication Data
US 2018/0310469 A1 Nov. 1, 2018

(51) Int. Cl.
*A01C 7/20* (2006.01)
*A01C 7/10* (2006.01)
*A01C 7/00* (2006.01)

(52) U.S. Cl.
CPC .............. *A01C 7/205* (2013.01); *A01C 7/006* (2013.01); *A01C 7/102* (2013.01); *A01C 7/203* (2013.01)

(58) Field of Classification Search
CPC ....... A01B 17/002; A01B 33/08; A01B 33/16; A01B 35/32; A01B 41/06; A01B 63/002;
(Continued)

(56) References Cited

U.S. PATENT DOCUMENTS 5,412,219 A 5/1995 Chappelle et al.
5,685,245 A * 11/1997 Bassett ................ A01B 63/114
111/62
(Continued)

FOREIGN PATENT DOCUMENTS

WO 20150077452 A1 5/2015
WO 2016025848 A 2/2016
(Continued)

OTHER PUBLICATIONS

Dickey, et al., "Determining crop residue cover with electronic image analysis", Biological Systems Engineering: Papers and Publications, Paper 238, DigitalCommons@universityofNebraska, Jan. 1, 1989.
(Continued)

*Primary Examiner* — Thomas G Black
*Assistant Examiner* — Ce Li Li
(74) *Attorney, Agent, or Firm* — Rebecca L. Henkel; Richard K. DeMille

(57) ABSTRACT

In one embodiment, one or more tangible, non-transitory, machine-readable media comprising instructions configured to cause a processor to receive a signal indicative of a residue coverage on a surface of an agricultural field from a sensor, and the sensor is positioned in front of a row unit of an agricultural product application system relative to a direction of travel. Further, the instructions are configured to cause the processor to determine the residue coverage on the surface of the agricultural field based on the signal, and the residue coverage includes a percentage of the agricultural field that is covered by residue, an evenness of the residue, or a combination thereof. Moreover, the instructions are configured to cause the processor to control an agricultural product control system of the agricultural product application system based on the residue coverage.

20 Claims, 4 Drawing Sheets

(58) Field of Classification Search
CPC ....... A01B 63/28; A01B 79/00; A01B 79/005; A01C 21/002; A01C 23/007; A01C 23/023; A01C 23/025; A01C 5/064; A01C 5/068; A01C 7/006; A01C 7/06; A01C 7/102; A01C 7/20; A01C 7/203; A01C 7/205; A01D 37/00; A01D 41/127; A01D 75/187; A01D 91/04; G05B 15/02; G06T 2207/10024; G06T 2207/10048; G06T 2210/61; G06T 7/13; G06T 7/174; G06T 7/90; H04N 5/33; H04N 7/181
See application file for complete search history.

(56) References Cited

U.S. PATENT DOCUMENTS

| | | | |
|---|---|---|---|
| 7,068,816 | B1 | 6/2006 | Knoblauch et al. |
| 7,877,970 | B1 * | 2/2011 | Crosby ................. A01D 37/00 56/10.2 R |
| 8,010,262 | B2 | 8/2011 | Schroeder et al. |
| 8,463,510 | B2 | 6/2013 | Knapp |
| 8,522,700 | B2 | 9/2013 | Landphair |
| 8,706,341 | B2 | 4/2014 | Madsen et al. |
| 8,862,339 | B2 | 10/2014 | Henry et al. |
| 9,119,388 | B2 | 9/2015 | Jens |
| 9,147,110 | B2 | 9/2015 | Anderson et al. |
| 9,271,439 | B2 | 3/2016 | Bourgault et al. |
| 9,282,688 | B2 | 3/2016 | Casper et al. |
| 9,489,576 | B2 | 11/2016 | Johnson et al. |
| 9,554,098 | B2 | 1/2017 | Casper et al. |
| 9,563,848 | B1 * | 2/2017 | Hunt ...................... G06N 5/045 |
| 9,585,301 | B1 | 3/2017 | Lund et al. |
| 9,585,307 | B2 | 3/2017 | Holland |
| 2008/0248843 | A1 | 10/2008 | Birrell et al. |
| 2012/0048159 | A1 * | 3/2012 | Adams ................. A01C 7/203 111/163 |
| 2012/0048160 | A1 * | 3/2012 | Adams ................. A01C 7/203 111/163 |
| 2012/0155714 | A1 | 6/2012 | Douglass et al. |
| 2013/0110358 | A1 | 5/2013 | Merx et al. |
| 2014/0379228 | A1 | 12/2014 | Batcheller et al. |
| 2015/0066932 | A1 * | 3/2015 | Stuber ................. G06Q 50/02 707/737 |
| 2015/0305224 | A1 * | 10/2015 | Casper ................. H04N 7/183 701/50 |
| 2015/0305226 | A1 | 10/2015 | Zemenchik |
| 2015/0354943 | A1 | 12/2015 | Posselius et al. |
| 2016/0029547 | A1 | 2/2016 | Casper et al. |
| 2016/0106022 | A1 * | 4/2016 | Adams ................. A01C 7/203 172/4 |
| 2016/0134844 | A1 * | 5/2016 | Casper ................. H04N 7/181 348/135 |
| 2016/0245703 | A1 * | 8/2016 | Takase ................. G01J 11/00 |
| 2017/0071124 | A1 | 3/2017 | Werner et al. |
| 2017/0112043 | A1 * | 4/2017 | Nair ..................... A01B 63/002 |
| 2017/0212059 | A1 * | 7/2017 | Charvat ................. G01N 22/00 |
| 2018/0125000 | A1 * | 5/2018 | Levy ..................... A01C 7/06 |

FOREIGN PATENT DOCUMENTS

| | | |
|---|---|---|
| WO | 2016049217 A | 3/2016 |
| WO | 2016182906 A1 | 11/2016 |
| WO | 2017004074 A1 | 1/2017 |

OTHER PUBLICATIONS

Thoma, et al., "Evalutaion of optical remote sensing models for crop residue cover assessment", Journal of Water and Soil Conservation, vol. 59, No. 5, 2004.
Morrison, et al., "Still video analysis of crop residue soil covers.", Information Systems Division, National Agricultural Library, 1991.

* cited by examiner

SYSTEM AND METHOD FOR CONTROLLING AGRICULTURAL PRODUCT APPLICATION BASED ON RESIDUE COVERAGE

BACKGROUND

The present disclosure relates generally to a system and method for controlling agricultural product application based on residue coverage.

Generally, seeding implements (e.g., seeders or planters) are towed behind a tractor or other work vehicle via a mounting bracket secured to a rigid frame of the implement. Seeding implements typically include multiple row units distributed across a width of the implement. Each row unit is configured to deposit seeds at a target depth beneath the soil surface of an agricultural field, thereby establishing rows of planted seeds. For example, each row unit typically includes a ground engaging tool or opener that forms a seeding path (e.g., trench) for seed deposition into the soil. A seed tube (e.g., coupled to the opener) is configured to deposit seeds and/or other agricultural products (e.g., fertilizer) into the trench. The opener/seed tube is followed by closing discs that move displaced soil back into the trench and/or a packer wheel that packs the soil on top of the deposited seeds. The amount of pressure required to reach a certain depth and the number of seeds deposited per area may depend on the amount of residue covering the surface of the agricultural field. Further, the residue coverage varies along the surface of the agricultural field so the down pressure, the penetration depth, and the seed application rate may not be accurate for the local residue coverage which may cause a reduction in a crop yield.

BRIEF DESCRIPTION

In one embodiment, one or more tangible, non-transitory, machine-readable media including instructions configured to cause a processor to receive a signal indicative of a residue coverage on a surface of an agricultural field from a sensor, and the sensor is positioned in front of a row unit of an agricultural product application system relative to a direction of travel. Further, the instructions are configured to cause the processor to determine the residue coverage on the surface of the agricultural field based on the signal, and the residue coverage includes a percentage of the agricultural field that is covered by residue, an evenness of the residue, or a combination thereof. Moreover, the instructions are configured to cause the processor to control an agricultural product control system of the agricultural product application system based on the residue coverage.

In another embodiment, A control system of an agricultural product application system includes a controller that receives a signal indicative of the residue coverage on the surface of the agricultural field from a sensor, and the sensor is positioned in front of a row unit of an agricultural product application system relative to a direction of travel. Further, the controller determines the residue coverage on the surface of the agricultural field based on the signal, and the residue coverage includes a percentage of the agricultural field that is covered by residue, an evenness value of the residue coverage, or a combination thereof. Moreover, the controller controls an agricultural product control system of the agricultural product application system based on the residue coverage In a further embodiment, a method for monitoring a residue coverage on a surface of an agricultural field includes receiving a signal, via a controller, indicative of the residue coverage on the surface of the agricultural field from a sensor, and the sensor is positioned in front of a row unit of an agricultural product application system relative to a direction of travel. The method further includes determining, via the controller, the residue coverage on the surface of the agricultural field based on the signal, and the residue coverage includes a percentage of the agricultural field that is covered by residue, an evenness of the residue, or a combination thereof. Moreover, the method includes controlling, via the controller, an agricultural product control system of the agricultural product application system based on the residue coverage.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

Figure 1:
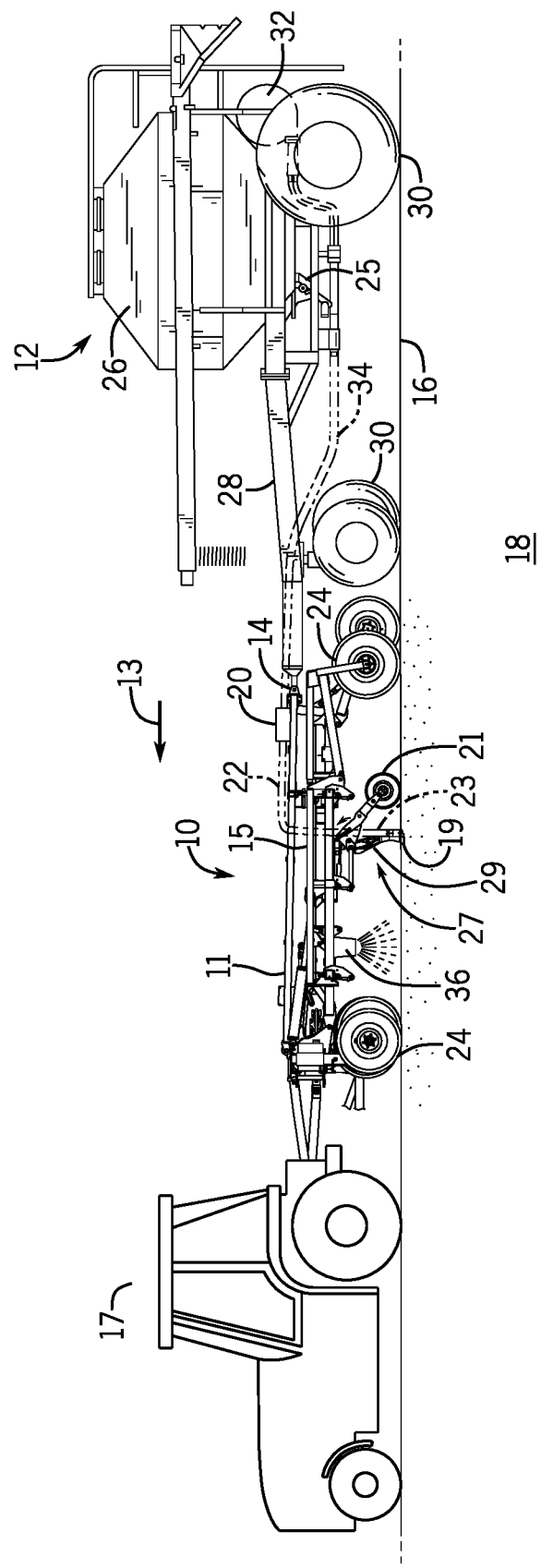
FIG. 1 is a side view of an embodiment of an agricultural product application system travelling along an agricultural field.

Turning now to the drawings, FIG. 1 is a side view of an embodiment of an agricultural product application system 10. As depicted, the agricultural product application system 10 (e.g., a seeding system or a planter system) includes an agricultural implement 11 coupled to an air cart 12. In the depicted embodiment, the air cart 12 is towed behind the agricultural implement 11, relative to a direction of travel 13. In addition, the agricultural implement 11 is coupled to a work vehicle 17 by a first hitch assembly, and the air cart 12 is coupled to the agricultural implement 11 by a second hitch assembly 14. While the agricultural implement 11 is towed between the work vehicle 17 and the air cart 12 in the illustrated embodiment, in other embodiments, the agricultural implement may be towed behind the air cart. In further embodiments, the implement and the air cart may be part of a single unit that is towed behind the work vehicle, or the agricultural implement and the air cart may be elements of a self-propelled vehicle.

The agricultural implement 11 may deposit rows of seeds into the soil as the agricultural implement 11 is towed across a surface 16 of an agricultural field 18 by the work vehicle 17. The agricultural implement 11 includes a tool frame 15 coupled to a row unit 27 (e.g., a ground engaging opener assembly), a distribution header 20, a hose 22, and wheel assemblies 24. The wheel assemblies 24 may contact the surface 16 to enable the agricultural implement 11 to be towed by the work vehicle 17. As the agricultural implement 11 moves in the direction of travel 13, a row of seeds may be deposited into the soil by the row unit 27. Although only one row unit 27 is shown, the agricultural implement 11 may include multiple row units 27 organized in a row across a width of the agricultural implement 11. In some embodiments, the agricultural implement 11 may include a row of 12, 14, 16, 18, 20, or more row units 27, which may each deposit a respective row of seeds.

To facilitate depositing seeds, each row unit 27 includes an opener 19, a press wheel 21, a seed tube 23, and a hydraulic cylinder 29. When the opener 19 engages the soil, the opener 19 may exert a force that excavates a trench into the soil as the row unit 27 travels through the field. In the present embodiment, a position of the press wheel 21 controls the depth of the opener 19 and the hydraulic cylinder 29 controls the downward force (e.g., a down pressure). For example, the opener 19 may be controlled to establish a target the depth of the trench. Seeds may then be deposited into the excavated trench via the seed tube 23. Then, the press wheel 21 may move the excavated soil into the trench to cover the seeds.

The air cart 12 may centrally store seeds and distribute the seeds to the row unit 27. Accordingly, the air cart 12 includes an agricultural product meter 25, a storage tank 26, a frame 28, wheels 30, and an air source 32. In the depicted embodiment, the air cart frame 28 is coupled to the tool frame 15 via the hitch 14. The wheels 30 may contact the surface 16 to enable the air cart 12 to be towed along with the agricultural implement 11. Additionally, the storage tank 26 may centrally store the seeds for distribution. In some embodiments, the storage tank 26 may include multiple compartments for storing different types of granular products. For example, a first compartment may store seeds while a second compartment may store a dry fertilizer. In such configurations, the air cart 12 may deliver both seed and fertilizer to the agricultural implement 11 via separate distribution systems, or as a mixture through a single distribution system.

Generally, the distribution system may control the amount of seeds distributed to the agricultural field 18, for example, using the agricultural product meter 25. For example, the agricultural product meter 25 may be controlled to increase or decrease the amount of seeds distributed to the agricultural field 18. As depicted, the agricultural product meter 25 is mounted to the bottom of the storage tank 26, which may enable the storage tank 26 to supply seeds to the agricultural product meter 25. The agricultural product meter 25 may then distribute the seeds to the distribution header 20 via a respective hose 34. The distribution headers 20 may then distribute the seeds to one or more row units 27 via the hose 22. In this manner, the agricultural product meter 25 may control distribution of seeds from the storage tank 26 to the row units 27 and into the trenches.

Conditions of the surface 16 may affect the target downward force applied by the row unit 27, the amount of seeds distributed to the row units 27, the penetration depth of the opener 19, or any combination thereof. For example, the surface may be covered by some amount of crop residue left on the ground from a harvesting operation. Further, a sensor assembly 36 is disposed in front of the row unit 27 relative to the direction of travel 13 to monitor the surface 16 in front of the row unit 27. While the sensor assembly 36 is coupled to a bottom portion of the frame 25 in the illustrated embodiment, the sensor assembly may be coupled to another suitable location on the agricultural product application system and/or on the work vehicle to enable the sensor assembly to monitor the surface in front of the row unit. The agricultural product application system 10 also includes an agricultural product control system, which includes a down pressure control system (e.g., the hydraulic cylinder coupled to the row unit), a penetration depth control system (e.g., an actuator that controls the press wheel position relative to the opener), and an agricultural product metering (e.g., a seed meter) control system.

Figure 2:
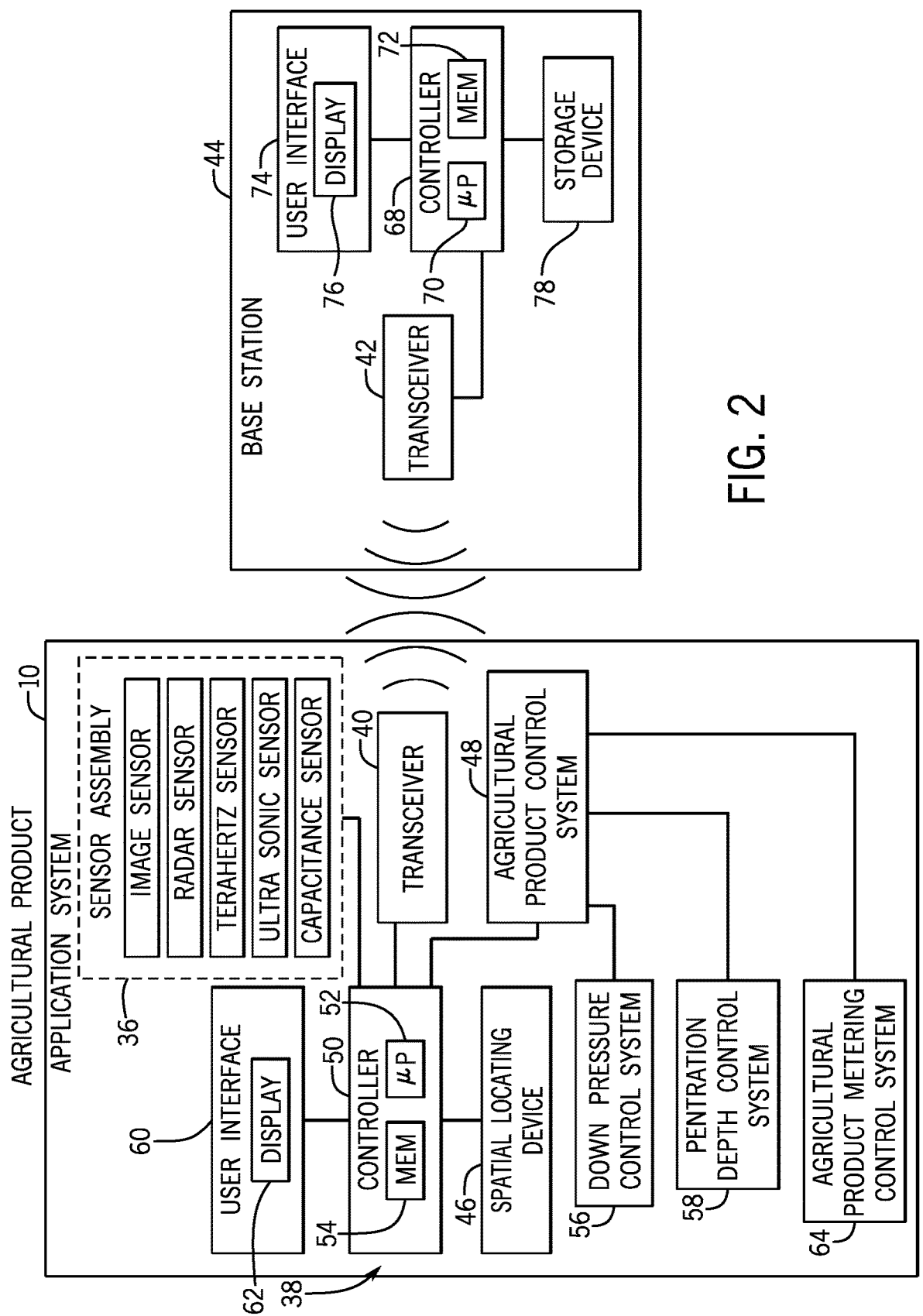
FIG. 2 is a schematic diagram of an embodiment of a control system that may be utilized within the agricultural product application system of FIG. 1.

FIG. 2 is a schematic diagram of an embodiment of a control system 38 that may be utilized within the agricultural product application system 10 of FIG. 1. In the illustrated embodiment, the control system 38 may be mounted on the implement of the agricultural product application system 10, on the air cart of the agricultural product application system 10, on the work vehicle, or distributed among the implement, the air cart, or the work vehicle. The control system 38 includes a first transceiver 40 configured to establish a wireless communication link with a second transceiver 42 of a base station 44. As will be appreciated, the first and second transceivers may operate at any suitable frequency range within the electromagnetic spectrum. For example, in certain embodiments, the transceivers may broadcast and receive radio waves within a frequency range of about 1 GHz to about 10 GHz. In addition, the first and second transceivers may utilize any suitable communication protocol, such as a standard protocol (e.g., Wi-Fi, Bluetooth, etc.) or a proprietary protocol. In other embodiments, the base station 44 may be omitted and components of the base station 44 may also be omitted or distributed among the implement, the air cart, or the work vehicle.

In the illustrated embodiment, the control system 38 includes a spatial locating device 46, which is mounted to the agricultural product application system 10 and configured to determine a position of the agricultural product application system 10. The spatial locating device may include any suitable system configured to determine the position of the agricultural product application system, such as a global positioning system (GPS), for example. In certain embodiments, the spatial locating device 46 may be configured to determine the position of the agricultural product application system 10 relative to a fixed point within the field (e.g., via a fixed radio transceiver). Accordingly, the spatial locating device 46 may be configured to determine the position of the agricultural product application system 10 relative to a fixed global coordinate system (e.g., via the GPS) or a fixed local coordinate system. In certain embodiments, the first transceiver 40 is configured to broadcast a signal indicative of the position of the agricultural product application system 10 to the transceiver 42 of the base station 44.

In addition, the agricultural product application system 10 includes the sensor assembly 36. The sensor assembly 36 is configured to output a signal indicative of the residue coverage on the surface of the agricultural field. In certain embodiments, the sensor assembly may include one or more sensors (e.g., image sensor(s), such as camera(s), radar sensor(s), terahertz sensor(s), infrared sensor(s), ultrasonic sensor(s), capacitance sensor(s), light detection and ranging (LiDAR) sensor(s), etc.), each configured to monitor the residue coverage on the surface in front of the row unit relative to the direction of travel. In addition, the sensor assembly may include a lighting assembly (e.g., an LED light, a halogen light, etc.) that provides light for the image sensor(s). The lighting assembly may reduce shadows cast by an element of the agricultural product application system structure, the sensor assembly, clouds in the sky, etc. Utilizing the lighting assembly may provide more consistent lighting for the image sensor(s), which may increase the accuracy of the data output by the sensor assembly 36. In certain embodiments, the sensor assembly may include a combination of different sensors, and the lighting assembly may be configured to provide light in different wavelengths of the electromagnetic spectrum. For example, the lighting assembly may output light in the infrared spectrum for an infrared sensor. As discussed in detail below, the residue coverage may include the percentage of the surface covered by residue, the evenness of the residue, the thickness of the residue, or any combination thereof.

The control system 38 includes an agricultural product application system controller 50 communicatively coupled to the sensor assembly 36, the transceiver 40, an agricultural product control system 48, a spatial locating device 46, a down pressure control system 56, a penetration depth control system 58, and an agricultural product metering control system 64. In certain embodiments, the agricultural product application system controller 50 is an electronic controller having electrical circuitry configured to process data from the transceiver 40, the spatial locating device 46, the sensor assembly 36, or a combination thereof, among other components of the agricultural product application system 10. In the illustrated embodiment, the agricultural product application system controller 50 includes a processor, such as the illustrated processor 52, and a memory device 54. The agricultural product application system controller 50 may also include one or more storage devices and/or other suitable components. The processor 52 may be used to execute software, such as software for controlling the agricultural product control system, and so forth. Moreover, the processor 52 may include multiple microprocessors, one or more "general-purpose" microprocessors, one or more special-purpose microprocessors, and/or one or more application specific integrated circuits (ASICS), or some combination thereof. For example, the processor 52 may include one or more reduced instruction set (RISC) processors.

The memory device 54 may include a volatile memory, such as random access memory (RAM), and/or a nonvolatile memory, such as ROM. The memory device 54 may store a variety of information and may be used for various purposes. For example, the memory device 54 may store processor-executable instructions (e.g., firmware or software) for the processor 52 to execute, such as instructions for controlling the agricultural product control system. The storage device(s) (e.g., nonvolatile storage) may include read-only memory (ROM), flash memory, a hard drive, or any other suitable optical, magnetic, or solid-state storage medium, or a combination thereof. The storage device(s) may store data (e.g., residue coverage maps, harvesting settings, etc.), instructions (e.g., software or firmware for controlling the agricultural product control system, etc.), and any other suitable data.

The control system 38 includes an agricultural product control system 48 configured to control various parameters of the agricultural product application system 10. For example, in certain embodiments, the agricultural product control system 48 may be configured to instruct the agricultural product application system controller 50 (e.g., via a communication link, such as a CAN bus or ISOBUS) to adjust the row unit 27 or the agricultural product meter 25. The agricultural product control system 48 includes the down pressure control system 56, the penetration depth control system 58, and the agricultural product metering control system 64. The agricultural product control system 48 controls these systems based on the residue coverage. For example, the agricultural product application system controller 50 may instruct the agricultural product control system 48 to change the down pressure of the row unit via the down pressure control system 56, the penetration depth of the opener via the penetration depth control system 58, the rate of seed application via the agricultural product metering control system 64, or any combination thereof.

In the illustrated embodiment, the control system 38 includes a user interface 60 communicatively coupled to the agricultural product application system controller 50. The user interface 60 is configured to present data to an operator (e.g., data associated with operation of the agricultural product application system). The user interface 60 is also configured to enable an operator to control certain functions of the agricultural product application system (e.g., starting and stopping the agricultural product application system, etc.). In the illustrated embodiment, the user interface 60 includes a display 62 configured to present information to the operator, such as the position of the agricultural product application system 10 within the field, the speed of the agricultural product application system 10, the path of the agricultural product application system 10, the residue coverage in front of the row unit of the agricultural product application system 10, images or video from the sensor assembly 36 (e.g., in embodiments in which the sensor assembly includes image sensor(s)), among other data.

As previously discussed, the control system 38 is configured to communicate with the base station 44 via the transceivers 40 and 42. In the illustrated embodiment, the base station includes a base station controller 68 communicatively coupled to the transceiver 42. The base station controller 68 may be configured to output commands and/or data to the agricultural product application system controller 50. For example, as discussed in detail below, the base station controller 68 may be configured to perform at least some of the operations associated with controlling the agricultural product control system 48.

In certain embodiments, the base station controller 68 is an electronic controller having electrical circuitry configured to process data from certain components of the base station 44 (e.g., the transceiver 42). In the illustrated embodiment, the base station controller 68 includes a processor, such as the illustrated microprocessor 70, and a memory device 72. The processor 68 may be used to execute software, such as software for providing commands and/or data to the agricultural product application system controller 50, and so forth. Moreover, the processor 52 may include multiple microprocessors, one or more "general-purpose"

microprocessors, one or more special-purpose microprocessors, and/or one or more application specific integrated circuits (ASICS), or some combination thereof. For example, the processor 70 may include one or more reduced instruction set (RISC) processors. The memory device 72 may include a volatile memory, such as random access memory (RAM), and/or a nonvolatile memory, such as ROM. The memory device 72 may store a variety of information and may be used for various purposes. For example, the memory device 72 may store processor-executable instructions (e.g., firmware or software) for the processor 70 to execute, such as instructions for providing commands and/or data to the agricultural product application system controller 50.

In the illustrated embodiment, the base station 44 includes a user interface 74 communicatively coupled to the base station controller 68. The user interface 74 is configured to present data from the agricultural product application system to an operator (e.g., data associated with operation of the agricultural product application system). The user interface 74 is also configured to enable an operator to control certain functions of the agricultural product application system (e.g., starting and stopping the agricultural product application system, etc.). In the illustrated embodiment, the user interface includes a display 76 configured to present information to the operator, such as the position of the agricultural product application system 10 within the field, the speed of the agricultural product application system, the path of the agricultural product application system, and the residue coverage in front of the agricultural product application system, among other data.

In the illustrated embodiment, the base station 44 includes a storage device 78 communicatively coupled to the base station controller 68. The storage device 78 (e.g., nonvolatile storage) may include read-only memory (ROM), flash memory, a hard drive, or any other suitable optical, magnetic, or solid-state storage medium, or a combination thereof. The storage device(s) may store data (e.g., residue coverage, etc.), instructions (e.g., software or firmware for commanding the agricultural product application system, etc.), and any other suitable data. For example, the agricultural product application system controller 50 or the base station controller 68 may receive the data from the sensor assembly 36 and the spatial locating device 46. From this data, the agricultural product application system controller 50 or the base station controller 68 may create a map of the residue coverage in the agricultural field 18. The map may include data relating to the location of the residue coverage (e.g., what percentage of the surface is covered by residue, the average size of the pieces of residue, the evenness of the spread of the residue (i.e., how uniform the residue is distributed in the image), the thickness of the residue, the size of the pieces of residue) in the agricultural field 18.

While the control system 38 includes the agricultural product application system controller 50 in the illustrated embodiment, the control system 38 may include the base station controller 68 in other embodiments. For example, in certain embodiments, control functions of the control system 38 may be distributed between the agricultural product application system controller 50 and the base station controller 68. In further embodiments, the base station controller 68 may perform a substantial portion of the control functions of the control system 38. For example, in certain embodiments, the transceiver 40 may output signals indicative of the residue coverage to the transceiver 42. In such embodiments, the transceiver 42 may output corresponding signals to the base station controller 68, and the base station controller 68 may determine the appropriate controls for the agricultural product control system 48 based on the residue coverage and output a signal indicative of the appropriate controls. For example, the base station controller 68 may output instructions to the agricultural product application system controller 50 (e.g., via the transceivers 40 and 42), instructing the agricultural product control system 48 to control a down pressure of the row unit, an amount of seeds distributed to the agricultural field, a penetration depth of the opener, or any combination thereof.

Figure 3:
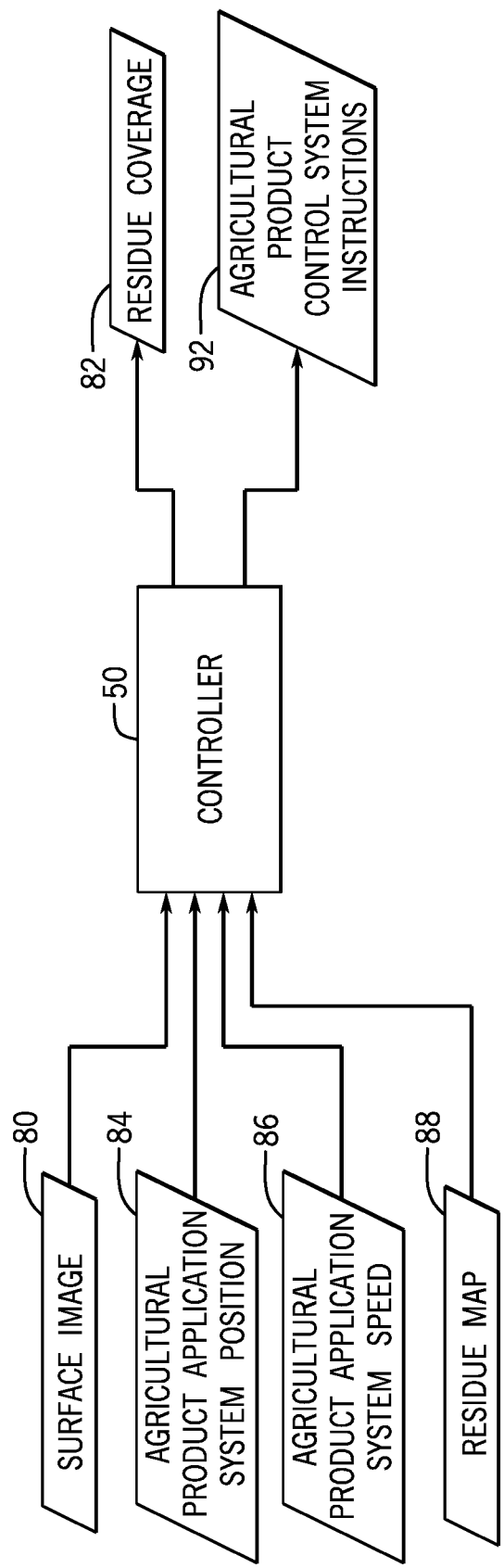
FIG. 3 is a block diagram of an embodiment of a controller that may be employed within the control system of FIG. 2.

FIG. 3 is a block diagram of an embodiment of the agricultural product application system controller 50 that may be employed within the control system of FIG. 2. In the illustrated embodiment, the control system includes the agricultural product application system controller 50. However, as previously discussed, the control system may include the base station controller (e.g., alone or in combination with the agricultural product application system controller 50). As illustrated, the agricultural product application system controller 50 receives a surface image signal 80 indicative of an image of the surface of the agricultural field. The surface image signal 80 is received from the sensor assembly, which is configured to monitor the surface by capturing images. In certain embodiments, the sensor assembly may include sensors whose output data is in formats other than images, or in formats that may be converted to images. For example, the sensors may output data in the form of graphs or tables or data. The agricultural product application system controller 50 determines a residue coverage output signal 82 indicative of the residue coverage of the surface based on the surface image signal 80. The controller may determine the residue coverage 82 by comparing differences in color when image data is received. For example, the residue may be a different color from the underlying soil of the agricultural field and/or the residue may be lighter than the soil. The agricultural product application system controller 50 may detect these differences and determine which portions of the surface image include residue and which portions of the surface image include soil. From this determination, the agricultural product application system controller 50 may determine various properties of the residue, including percentage of surface coverage, average residue particle size, the evenness of the spread of the residue (e.g., uniformity of the residue distribution in the image), thickness, or a combination thereof.

In the illustrated embodiment, the agricultural product application system controller 50 also receives a position signal 84 indicative of the agricultural product application system position. Further, in the illustrated embodiment, the agricultural product application system controller 50 receives a speed signal 86 indicative of the agricultural product application system speed. In certain embodiments, the position signal 84 and the speed signal 86 are received from the spatial locating device, which is configured to determine the location and rate of change of the location (e.g., speed and/or acceleration) of the agricultural product application system. In the present embodiment, the agricultural product application system controller 50 may also receive a map signal 88 indicative of a residue coverage map; however, in other embodiments, the controller may not receive the map signal 88. The residue coverage map is a map that includes residue coverage and associated location throughout the agricultural field. Further, the residue coverage map may be created prior to agricultural product application operations (e.g., during a harvesting or tilling operation). The agricultural product application system controller 50 may receive the map signal 88 and may display a visual representation of the map signal 88 in real-time to an operator (e.g., via the user interface of the agricultural product application system or base station). In addition, the map signal 88 may also be received from the storage device. In some embodiments, the agricultural product application system controller 50 may not receive the surface image signal 80 or determine the residue coverage output signal 82, instead utilizing the position signal 84, the speed signal 86, and the map signal 88.

As discussed above, the agricultural product application system controller 50 may receive the residue coverage output signal 82 and the map signal 88 and may display a visual representation of the residue coverage output signal 82 and the map signal 88 to an operator (e.g., on the display of the agricultural product application system user interface or the display of the base station user interface). In turn, the operator may manually control the agricultural product control system to control a down pressure of the row unit, an amount of seeds distributed to the agricultural field, a penetration depth of the opener, or any combination thereof. In other embodiments, the controller may control the agricultural product control system by outputting an agricultural product control system instructions output signal 92 indicative of the agricultural product control system instructions. For example, the agricultural product control system instructions may include a down pressure of the row unit, an amount of seeds distributed to the agricultural field, a penetration depth of the opener, or any combination thereof. The agricultural product control system instructions output signal 92 may be output substantially continuously (e.g., at a frequency of a second or less), the agricultural product control system instructions output signal 92 may be output at time intervals (e.g., every minute, every thirty seconds, etc.), or the agricultural product application system controller 50 may output the agricultural product control system instructions output signal 92 after a threshold value has been reached. For example, the controller may set operating parameters to an initial set of values based on the map signal 88. Further, the controller may assign a threshold value for each of the residue coverage properties (e.g., percentage of the surface covered by residue, the evenness of the residue, the thickness of the residue). The threshold value is measured by comparing the difference between the map signal 88 and the residue coverage output signal 82. After the threshold value has been exceeded for any combination of the residue coverage properties, the controller may output the agricultural product control system instructions output signal 92 to update the initial operating parameters based on the threshold value being exceeded.

For example, in updating the operating parameter, the agricultural product application system controller 50 may output the agricultural product control system setting output signal 92 to adjust the down pressure of each of the row units separately such that the row units travelling over more residue have a higher down pressure than the row units travelling over less residue. In addition, if the agricultural product application system controller 50 determines that the pieces of residue are increasing in size, the down pressure of the row units may be increased. In addition, if the agricultural product application system controller 50 determines that the percentage of the surface covered by residue is increasing, the down pressure of the row units may be increased.

Further, the rate of agricultural product deposited, as determined by the agricultural product meter, may be increased or decreased based on certain residue coverage properties. The target rate of agricultural product deposited into the ground may increase as the percentage of residue surface coverage increases, and reach a peak at a certain percentage of residue surface coverage (e.g., 30 percent, 40 percent, 45 percent, 50 percent, 55 percent, 60 percent, or 70 percent of the surface covered by residue). Then, the target application rate of agricultural product may decrease after reaching the peak. For example, if the agricultural product application system controller 50 determines that the percentage of the surface covered by residue is below the peak percentage, then the agricultural product application system controller 50 may instruct the agricultural product metering control system to increase application rate of agricultural product. If the agricultural product application system controller 50 determines that the percentage of the surface covered by residue is above the peak percentage, then the agricultural product application system controller 50 may instruct the agricultural product metering control system to decrease application rate of agricultural product.

Figure 4:
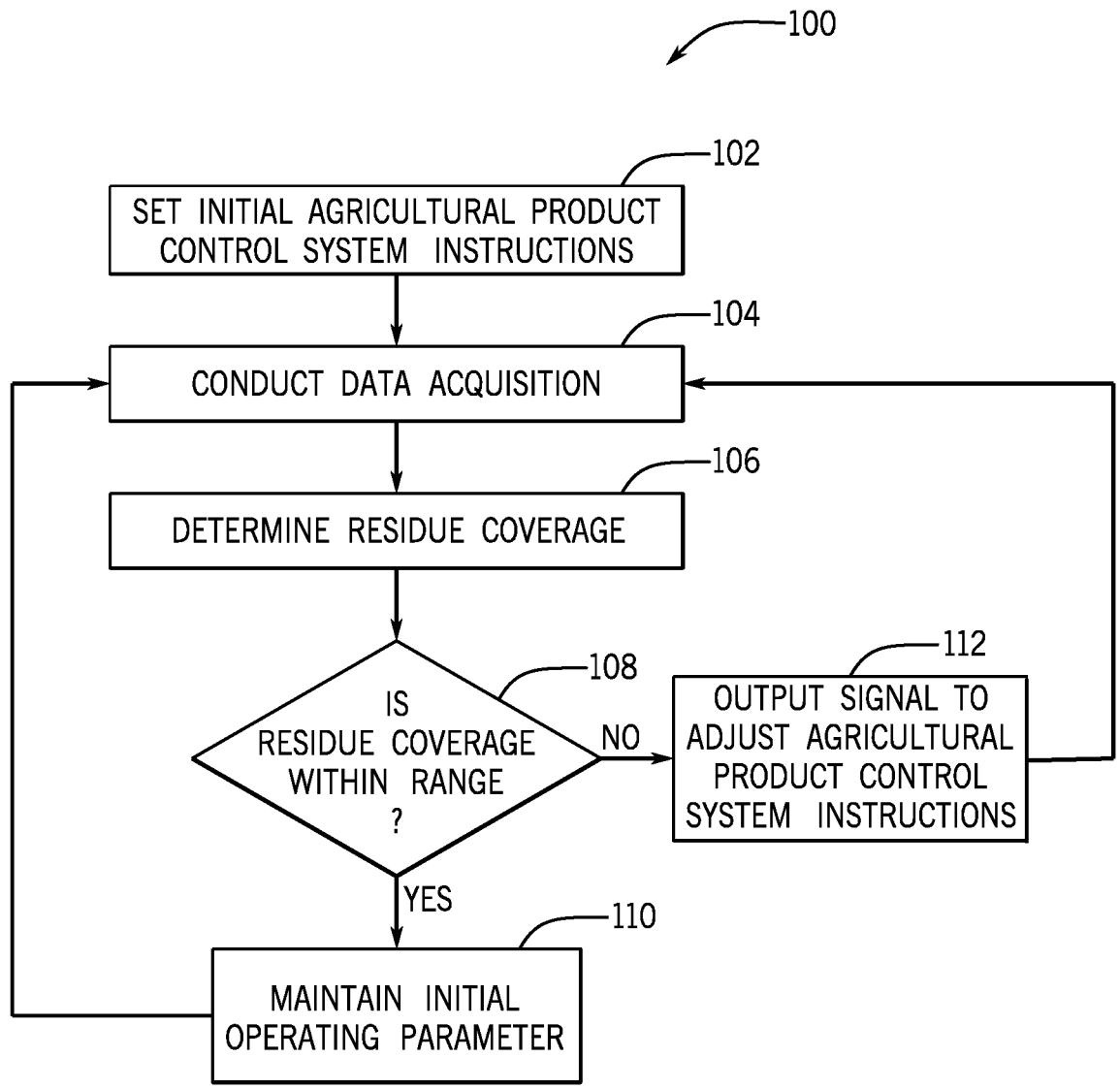
FIG. 4 is a flowchart of an embodiment of a process for controlling an agricultural product control system of the agricultural product application system of FIG. 1.

FIG. 4 is a flowchart of an embodiment of a process 100 for controlling an agricultural product control system of the agricultural product application system 10. The process 100 increases the yield by adjusting operating parameters based on residue coverage. Although the following process 100 includes a number of operations that may be performed, it should be noted that the process 100 may be performed in a variety of suitable orders. All of the operations of the process 100 may not be performed. Further, all of the operations of the process 100 may be performed by the agricultural product application system controller 50, the base station controller, or a combination thereof.

Initial agricultural product control system instructions of the agricultural product control system may be set (block 102). For example the operator may set an initial down pressure of the row units, a penetration depth of the opener, an application rate of agricultural product, or a combination thereof. In certain embodiments, the initial operating parameters are based on prior agricultural operations from a previous season or from saved initial settings. Then, data acquisition may be conducted (block 104). For example, the sensor assembly may include one or more sensors (e.g., image sensor(s), such as camera(s), radar sensor(s), terahertz sensor(s), infrared sensor(s), ultrasonic sensor(s), capacitance sensor(s), light detection and ranging (LiDAR) sensor(s), etc.), each configured to monitor the residue coverage on the surface in front of the row unit relative to the direction of travel. In addition, the sensor assembly may include a lighting assembly (e.g., an LED light, a halogen light, etc.) that provides light for the image sensor(s). The lighting assembly may reduce shadows cast by an element of the agricultural product application system structure, the sensor assembly, clouds in the sky, etc. Utilizing the lighting assembly may provide more consistent lighting for the image sensor(s), which may increase the accuracy of the data output by the sensor assembly.

Next, the residue coverage is determined (block 106). After conducting the data acquisition, the controller may analyze the data to determine the residue coverage on the surface of the agricultural field. As discussed above, the residue coverage may include properties relating to percentage of surface coverage, average residue particle size, the evenness of the spread of the residue (e.g., uniformity of the residue distribution in the image), thickness, or a combination thereof, among other residue properties.

The residue coverage is then evaluated (block 108). For example, the controller may evaluate whether one or more of the residue coverage properties are within a specified range. In certain embodiments, the range may include a threshold minimum value, a threshold maximum value, or a combination thereof. For example, the range may include a threshold minimum value corresponding to the percentage of the surface is covered by residue (i.e., 5 percent, 10 percent, 20 percent, 30 percent, 40 percent, 50 percent), the average size of the pieces of residue (i.e., 1 centimeter ("cm"), 2 cm, 3 cm, 4 cm, 5 cm), the evenness of the spread of the residue, the thickness of the residue, or the position of the residue relative to the agricultural product application system. Further, the range may include a threshold maximum value corresponding to the percentage of the surface is covered by residue (i.e., 40 percent, 50 percent, 60 percent, 70 percent, 80 percent, 90 percent), the average size of the pieces of residue (i.e., 3 cm, 5 cm, 7 cm, 10 cm, 15 cm), the evenness of the spread of the residue, the thickness of the residue, or the position of the residue relative to the agricultural product application system. In addition, a threshold value for each of the residue coverage properties (e.g., percentage of the surface covered by residue, the evenness of the residue, the thickness of the residue) may be assigned. The threshold value may be determined by comparing the difference between the residue coverage map and the measured residue coverage.

If the residue coverage is within the specified range, the controller may output a signal to the residue coverage system indicative of instructions to maintain (block 110) the initial operating parameter until a threshold value has been reached. Thereafter, the sensor assembly may continue to conduct (block 104) data acquisition as the agricultural product application system travels through the agricultural field.

However, if the controller determines that a threshold value has been exceeded, the controller may output (block 112) a signal to the agricultural product control system indicative of instructions to adjust the agricultural product control system instructions from the initial operating parameter to an adjusted operating parameter. The adjusted operating parameter may be determined by referencing a data table that includes changes to operating parameter values correlated to desired changes in seeding properties. For example, if an increase of 10% in percentage of the surface covered by residue is detected, the data table may include corresponding changes in operating parameter values relating to the down pressure of the openers and the seed rate through the agricultural product meter. Thereafter, the sensor assembly may conduct (block 104) additional data acquisition. Accordingly, the product application control may be monitored and adjusted during seeding and planting.

While only certain features of the disclosure have been illustrated and described herein, many modifications and changes will occur to those skilled in the art. It is, therefore, to be understood that the appended claims are intended to cover all such modifications and changes as fall within the true spirit of the disclosure.

The invention claimed is:

1. One or more tangible, non-transitory, machine-readable media comprising instructions configured to cause a processor to:
receive a signal indicative of a residue coverage on a surface of an agricultural field from a sensor, wherein the sensor is positioned in front of a row unit of an agricultural product application system relative to a direction of travel;
determine the residue coverage on the surface of the agricultural field based on the signal, wherein the residue coverage comprises a percentage of the agricultural field that is covered by residue; and
control an agricultural product control system of the agricultural product application system based on the residue coverage;
wherein the instructions are configured to cause the processor to control an agricultural product metering control system of the agricultural product control system to output agricultural product at a target application rate, the target application rate increases as the percentage increases while the percentage is below a threshold percentage, and the target application rate decreases as the percentage increases while the percentage is above the threshold percentage.

2. The one or more tangible, non-transitory, machine-readable media comprising instructions of claim 1, wherein the instructions are configured to cause the processor to receive a map of the residue coverage on the surface of the agricultural field.

3. The one or more tangible, non-transitory, machine-readable media comprising instructions of claim 2, wherein the instructions are configured to cause the processor to set an operating parameter of the agricultural product control system to an initial value based at least in part on the map of the residue coverage.

4. The one or more tangible, non-transitory, machine-readable media comprising instructions of claim 3, wherein the instructions are configured to cause the processor to maintain the operating parameter until a threshold value of the residue coverage is detected.

5. The one or more tangible, non-transitory, machine-readable media comprising instructions of claim 3, wherein the instructions are configured to cause the processor to update the operating parameter in response to a difference between the residue coverage and the map of the residue coverage exceeding a threshold value.

6. The one or more tangible, non-transitory, machine-readable media comprising instructions of claim 1, wherein the instructions are configured to cause the processor to control a down pressure control system of the agricultural product control system based on the residue coverage to control a down pressure of the row unit of the agricultural product application system.

7. The one or more tangible, non-transitory, machine-readable media comprising instructions of claim 1, wherein the instructions are configured to cause the processor to control a penetration depth control system of the agricultural product control system based on the residue coverage to control a penetration depth of an opener of the agricultural product application system.

8. The one or more tangible, non-transitory, machine-readable media comprising instructions of claim 1, wherein the threshold percentage is 50 percent coverage of the agricultural field by the residue.

9. A control system of an agricultural product application system comprising:
a controller configured to:
receive a signal indicative of the residue coverage on the surface of the agricultural field from a sensor, wherein the sensor is positioned in front of a row unit of an agricultural product application system relative to a direction of travel;
determine the residue coverage on the surface of the agricultural field based on the signal, wherein the residue coverage comprises a percentage of the agricultural field that is covered by residue; and
control an agricultural product control system of the agricultural product application system based on the residue coverage;

wherein the controller is configured to control an agricultural product metering control system of the agricultural product control system to output agricultural product at a target application rate, the target application rate increases as the percentage increases while the percentage is below a threshold percentage, and the target application rate decreases as the percentage increases while the percentage is above the threshold percentage.

10. The control system of claim 9, wherein the sensor comprises a camera and a lighting assembly, wherein the lighting assembly is configured to illuminate the surface of the agricultural field.

11. The control system of claim 9, wherein the sensor comprises a terahertz sensor.

12. The control system of claim 9, wherein the controller is configured to control a down pressure control system of the agricultural product control system based on the residue coverage to control a down pressure of the row unit of the agricultural product application system.

13. The control system of claim 9, wherein the controller is configured to control a penetration depth control system of the agricultural product control system based on the residue coverage to control a penetration depth of an opener of the agricultural product application system.

14. The control system of claim 9, wherein the controller is configured to receive a map of the residue coverage on the surface of the agricultural field, and set an operating parameter of the agricultural product control system to an initial value based at least in part on the map of the residue coverage.

15. The control system of claim 9, wherein the threshold percentage is 50 percent coverage of the agricultural field by the residue.

16. A method for monitoring a residue coverage on a surface of an agricultural field comprising:
receiving a signal, via a controller, indicative of the residue coverage on the surface of the agricultural field from a sensor, wherein the sensor is positioned in front of a row unit of an agricultural product application system relative to a direction of travel;
determining, via the controller, the residue coverage on the surface of the agricultural field based on the signal, wherein the residue coverage comprises a percentage of the agricultural field that is covered by residue; and
controlling, via the controller, an agricultural product control system of the agricultural product application system based on the residue coverage;
wherein controlling the agricultural product control system comprises controlling an agricultural product metering control system of the agricultural product control system to output agricultural product at a target application rate, the target application rate increases as the percentage increases while the percentage is below a threshold percentage, and the target application rate decreases as the percentage increases while the percentage is above the threshold percentage.

17. The method of claim 16, comprising receiving, via the controller, a map of the residue coverage on the surface of the agricultural field.

18. The method of claim 17, comprising setting, via the controller, an operating parameter of the agricultural product control system to an initial value based at least in part on the map of the residue coverage, wherein the operating parameter comprises a down pressure of the row unit, a penetration depth of an opener of the agricultural product application system, the target application rate, or any combination thereof.

19. The method of claim 18, comprising updating, via the controller, the operating parameter in response to a difference between the residue coverage and the map of the residue coverage exceeding a threshold value.

20. The method of claim 16, wherein the threshold percentage is 50 percent coverage of the agricultural field by the residue.

* * * * *